US012711225B2

(12) United States Patent
Melamed et al.

(10) Patent No.: US 12,711,225 B2
(45) Date of Patent: Aug. 18, 2026

(54) ENTITY RISK ASSESSMENT

(71) Applicant: Microsoft Technology Licensing, LLC, Redmond, WA (US)

(72) Inventors: Yaniv Melamed, Herzelia (IL); Jonatan Zukerman, Herzelia (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 18/610,242

(22) Filed: Mar. 19, 2024

(65) Prior Publication Data

US 2025/0298889 A1 Sep. 25, 2025

(51) Int. Cl.
*G06F 21/55* (2013.01)
*G06F 21/56* (2013.01)

(52) U.S. Cl.
CPC ............ *G06F 21/554* (2013.01); *G06F 21/56* (2013.01); *G06F 2221/2141* (2013.01)

(58) Field of Classification Search
None
See application file for complete search history.

(56) References Cited

U.S. PATENT DOCUMENTS

2020/0285737 A1* 9/2020 Kraus ................... G06F 21/552
2021/0406112 A1* 12/2021 Moss .................. G06F 11/0751
2023/0308460 A1* 9/2023 Thomas ................ H04L 63/102
2024/0223592 A1* 7/2024 Bazalgette .......... H04L 63/1425
2025/0068967 A1* 2/2025 Kim ....................... G06N 20/00

OTHER PUBLICATIONS

Extended European Search Report received for EP Application No. 25161912.8, mailed on Jul. 22, 2025, 10 pages.
"How to Create a Classification model using XGBoost in Python," Retrieved From: https://practicaldatascience.co.uk/machine-learning/how-to-create-a-classification-model-using-xgboost, 2023, 5 Pages.
"OpenAI Text Embeddings," Accessed on the Link: https://platform.openai.com/docs/models/embeddings, Retrieved date: Apr. 3, 2024, 1 page.
"Reference List of Microsoft Defender Alerts," Accessed on the Link: https://learn.microsoft.com/en-us/azure/defender-for-cloud/alerts-reference, Article date: Mar. 17, 2024, 156 Pages.
"XGBoost Model," Github Page, Apache-2.0 License, Accessed on the Link: https://github.com/dmlc/xgboost, Retrieved date: Apr. 3, 2024, 4 Pages.

(Continued)

*Primary Examiner* — Hee K Song
(74) *Attorney, Agent, or Firm* — Barta Jones, PLLC

(57) ABSTRACT

A computer-implemented method includes receiving a plurality of security signals relating to at least one entity. A string is generated based on the plurality of security signals, the string including a name of each security signal and a timestamp of each security signal. The string is input to a trained embedding model and in response an embedding vector corresponding to the string is received. The embedding vector is input to a trained machine learning model and in response an output is received, the output being indicative of whether the plurality of security signals is representative of malicious activity.

20 Claims, 7 Drawing Sheets

(56) References Cited

OTHER PUBLICATIONS

Anashkin, et al., "About the System of Profiling User Actions Based on the Behavior Model", IEEE Conference of Russian Young Researchers in Electrical and Electronic Engineering, 2021, pp. 191-195.
Anashkin, et al., "Implementation of Behavioral Indicators in Threat Detection and User Behavior Analysis", CEUR Workshop Proceedings, 2022, pp. 17-24.
Brownlee, Jason, "How to Use XGBoost for Time Series Forecasting," Accessed on the Link: https://machinelearningmastery.com/xgboost-for-time-series-forecasting/, Mar. 19, 2021, 55 Pages.
Cerliani, Marco, "Time2Vec for Time Series Features Encoding," Accessed on Link: https://towardsdatascience.com/time2vec-for-time-series-features-encoding-a03a4f3f937e, Sep. 25, 2019, 10 Pages.
Greene, et al., "New and Improved Embedding Model," Retrieved From: https://openai.com/blog/new-and-improved-embedding-model, Dec. 15, 2022, 10 Pages.
Hong, et al., "Event2vec: Learning Representations of Events on Temporal Sequences", In Web and Big Data: First International Joint Conference, APWeb-WAIM 2017, Beijing, China, Proceedings, vol. 10367, 2017, pp. 33-47.
Li, et al., "Time-Dependent Representation for Neural Event Sequence Prediction," arXiv preprint arXiv:1708.00065, Jul. 20, 2018, 11 Pages.
Liu, et al., "Context2Vector: Accelerating security event triage via context representation learning", Information and Software Technology, vol. 146, Jun. 1, 2022, 7 pages.
Lundberg, et al., "A Unified Approach to Interpreting Model Predictions", Advances in Neural Information Processing Systems, Dec. 4, 2017, 10 pages.
Nalmpantis, et al., "Signal2Vec: Time Series Embedding Representation", In International conference on engineering applications of neural networks, May 2019, 12 pages.
Neelakantan, et al., "Text embeddings", Open AI, accessed on Link URL: https://platform.openai.com/docs/guides/embeddings, 2022, 6 pages.
Shen, et al., "Leveraging Temporal Word Embeddings to Understand the Evolution of Cyberattacks", In 28th USENIX Security Symposium (USENIX Security 19), 2019, pp. 905-921.
Tec, et al., "Weather2vec: Representation Learning for Causal Inference with Non-Local Confounding in Air Pollution and Climate Studies", Arxiv Cornell University, vol. 2, Dec. 11, 2022, 15 pages.
Torricelli, et al., "weg2vec: Event Embedding for Temporal Networks," Scientific Reports, Apr. 28, 2020, pp. 1-35.
Torricelli, et al., "weg2vec: Event embedding for temporal networks", Scientific Reports, vol. 10, No. 7164, Apr. 28, 2020, 11 pages.

* cited by examiner

Figure 7

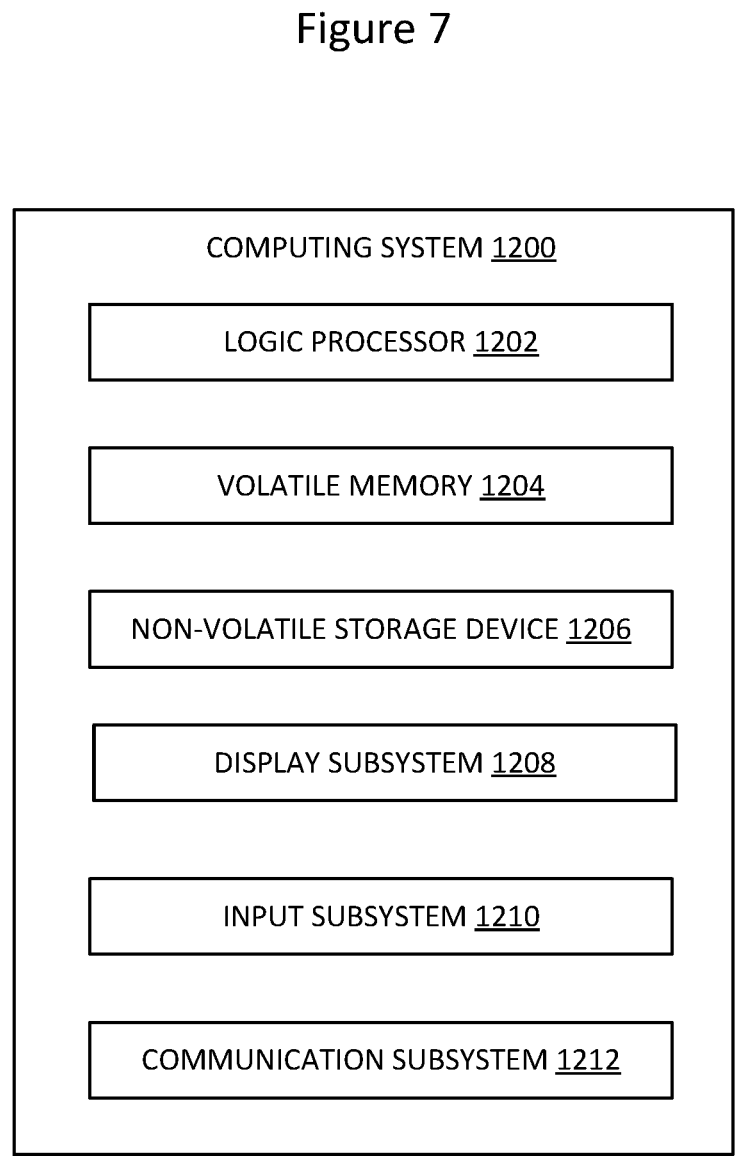

COMPUTING SYSTEM 1200

LOGIC PROCESSOR 1202

VOLATILE MEMORY 1204

NON-VOLATILE STORAGE DEVICE 1206

DISPLAY SUBSYSTEM 1208

INPUT SUBSYSTEM 1210

COMMUNICATION SUBSYSTEM 1212

ENTITY RISK ASSESSMENT

BACKGROUND

Cyber-attacks are a persistent and evolving threat to computer networks and systems of all types and sizes. A wide variety of software products have been developed which are able to detect, record and react to a wide range of attacks, including those carried out by external actors and internal actors. Example products include Microsoft's XDR (extended detection and response) tool and SIEM (security information and event management) tool. Other products include EDR (endpoint detection and response) tools, cloud SOC (security operations center) software and so on.

These tools, and other further application-specific security tools, include logic for detecting events related to the particular types of security threats that they are intended to monitor, and which may be in some way indicative of a cyber-attack. Examples include failed logins, brute force access attempts, situations where access attempts from different geographical locations are indicative of impossible travel, activities from unusual geographic locations, suspicious emails and so on. The tools store data relating to these events and similar events, for example in databases or logs. The data representing the events are referred to herein as security signals.

SUMMARY

According to one aspect of the disclosure, there is provided a computer implemented method comprising: receiving a plurality of security signals; generating a string based on the plurality of security signals, the string including a name of each security signal and a timestamp of each security signal; inputting the string to a trained embedding model and in response receiving an embedding vector corresponding to the string; and inputting the embedding vector to a trained machine learning model and in response receiving an output indicative of whether the plurality of security signals are representative of malicious activity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 7 is a schematic block diagram of an example computing system.

DETAILED DESCRIPTION

Figure 1:
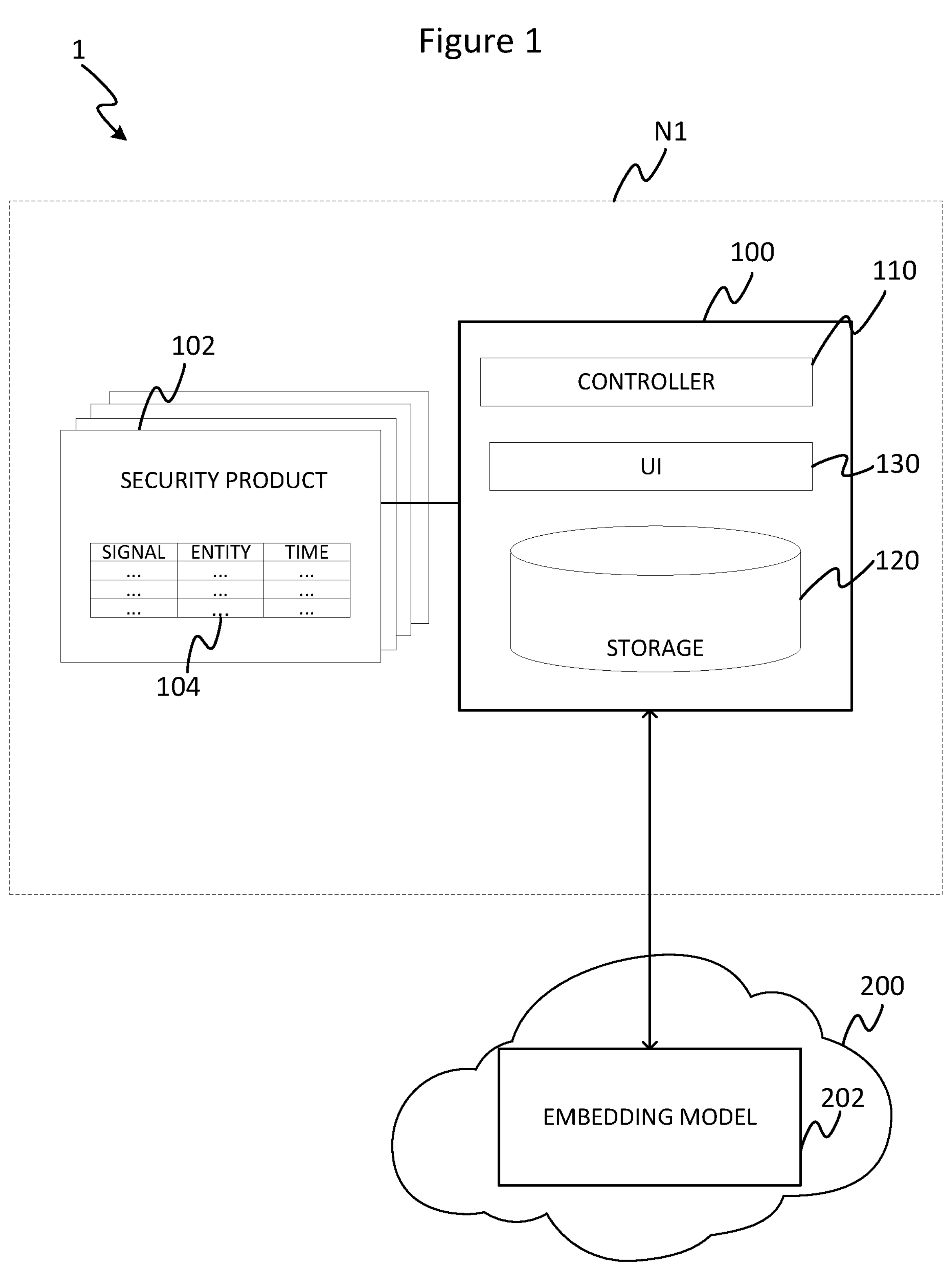
FIG. 1 is a schematic block diagram of an example environment including a system according to the disclosure.

In some previous techniques, security signals are processed using hard-coded rules or heuristics to generate a feature vector. The feature vector does not encode the semantics of the security signals (i.e. the signal names and meanings thereof) or any temporal information. The feature vectors instead count the numbers of each type of event. This may be referred to as a "tabular" approach, in the sense that the constructed vectors effectively for a table counting the frequency of various types of specific suspicious signals. Labelled feature vectors of this sort are then used in supervised machine learning techniques to generate a trained model, which can then predict the label of unseen, unlabeled data.

In overview, examples of the disclosure relate to techniques that instead generate a string comprising the names and time stamps of a plurality of security signals. The string is then provided as input to an embedding model, which outputs a vector representation of the string. One example of such a model is the text-embedding-ada-002 model provided by OpenAI, but other embedding models are possible. The embedding model may be trained on a sufficiently large dataset including security signal names and temporal data so that it is able to effectively represent the meaning of the string in vectorized, numerical form. Such embedding vectors can then form the basis for training of a supervised machine learning model, in a manner similar to those discussed above.

In some examples of the disclosure, the string may include other information pertinent to the plurality of security signals, such as an identifier (e.g. a name) of the security product that generated the security signal, or a severity level of the event represented by the security signal. In some examples, the input to the embedding model may also include data of other modalities correspond to each security signal, such as image data (e.g. video or still images, such as surveillance images), audio data, sensor data and so on. In such examples, the embedding model may be a multi-modal embedding model.

Whilst individual security signals may represent relatively low-level individual events, from which in isolation it may be difficult to detect or predict malicious activity, the techniques herein determine from a plurality of security signals (e.g. related to a particular entity such as a user account and collected over a certain time period), whether the security signals are indicative of a significant security risk. The techniques make use of a trained embedding model to encode a string including the names and timestamps of the security signals. This embedding may inherently capture the temporal information associated with the signals, as well as the semantic information present in the names of the security signals, which are generally indicative of the underlying alert or detection. Consequently, a machine learning model trained on such embedding is able to accurately determine whether the security signals represent malicious activity.

FIG. 1 illustrates an environment 1 in which examples of the disclosure may operate.

The environment 1 includes a computer system 100, which forms part of a computer network N1 comprising a plurality of other connected computer systems. The computer systems are connected by any suitable network connection, including any combination of wired and wireless links and local and wide area networks.

The network N1 forms a system or domain that is being monitored or protected by one or more security products 102. In general, each security product 102 comprises one or more pieces of software (i.e. computer-executable instructions) that when executed by a processor cause the security product 102 to monitor the computer systems in the domain. Example products 102 include Microsoft's XDR (extended detection and response) tool and SIEM (security information and event management) tool, but it will be understood that a wide variety of security products 102 may be employed, each of which may be configured monitor one or more different types of malicious activity.

By malicious activity, we broadly mean any type of activity that is indicative of a cybersecurity threat or attack. This may include, but is not limited to, passive and active attacks, inside attacks perpetrated by system users and outside attacks by external actors. It may include any number of different attack vectors or types, including unauthorized access (e.g. by brute force password cracking or other techniques), the installation of malicious software (e.g. malware such as trojan horses, viruses, worms, ransomware, spyware, keyloggers and other data scraping software), denial-of-service attacks, and so on.

Although the figures illustrate that each different security product 102 operates on a different computer system, it will be understood that this is merely an example. It could equally be the case that multiple security products 102 reside on the same computer system, or that a single computer system comprises all of the security products 102.

Each security product 102 generates security signals 104, which are illustrated in tabular form on FIG. 1. The security signals 104 correspond to conditions (also referred to herein as events) detected by the respective security products. That is to say the security signals 104 may be data generated by a security product 102 as a result of a condition detected by the product 102. The security signal 104 comprises suitable data representative of the fact that the condition was detected. As discussed in more detail below, that includes the name of the signal, the timestamp, and may include other relevant data.

In one example, a security signal 104 may be data representative of an alert. In another example, a security signal 104 may be data representative of an incident, which may correspond to or be generated in response to multiple alerts. In another example, the security signal 104 may be representative of an attack, which may be a type of incident. In another example, the security signal 104 may be representative of a vulnerability detection in the system being monitored by the product 102. In general, security signals 104 may correspond to any suitable security event, warning or detection generated by the security product in response to some condition occurring on one or more of the computer systems in the network.

One example signal 104 (see FIG. 2) is Alert_Bruteforce, indicative of a brute force attack to access a user account or other resource. Another example signal 104 is Alert_ImpossibleTravel, which indicates a situation where the same user connects from two different geographical locations and the time between those connections would not be possible by physical travel.

It will be understood that a wide variety of security signals 104, each comprising data representative of a corresponding wide variety of security events, are possible and contemplated within the scope of this disclosure. For example, signals 104 may comprise data that relates to anomalous activities such as activity from an infrequent country, activity from an anonymous IP address, activity performed by a terminated user, activity from a suspicious IP address, unusual file download or sharing activities, unusual file access or virtual machine creation, multiple failed login attempts, data exfiltration attempts, and so on.

Further example security signals 104 include those listed at: https://learn.microsoft.com/en-us/azure/defender-for-cloud/alerts-reference.

The signals 104 may be stored in a suitable data structure associated with each product, such as a database (e.g. a relational database) or a log file.

Each signal 104 has a name reflective of the condition associated with the signal, and a timestamp, indicative of the time that the signal was generated. This may effectively correspond to the time at which the underlying condition was detected or occurred. The examples (see FIG. 2) illustrate the timestamp in the format YYYY-MM-DD HH:MM:SS, but it will be understood that the timestamp may be in any suitable format expressing units of time in any suitable level of granularity.

Each signal 104 may also be associated with a particular entity. In this context, an entity may be a user (or more specifically a particular user account), a network location or address (e.g. an internet protocol (IP) address or uniform resource locator (URL)), a file or a filehash, a particular physical device or system (e.g. identifiable by a suitable address such as a MAC address), or a virtual machine (VM) or container.

The controller 110 includes a processor or other compute unit configured to execute instructions stored in the storage 120, to carry out the operations and processes discussed in further detail herein. The storage 120 may include volatile and non-volatile memory. The system 100 may also further include a suitable user interface 130.

The computer system 100 is configured to receive the security signals 104 from the computer systems 102 generating the security signals. For example, the computer system 100 may periodically retrieve new signals 104—effectively "pulling" them from the other systems 102. Alternatively or additionally, the other computer systems may transmit the security signals 104 to the system 100—"pushing" them to the system 100. Once received, the computer system 100 may store the signals in a suitable data structure (e.g. a database) in storage 120.

Although illustrated as a separate computer system 100, it will be understood that in some examples the functionality of computer system 100 may be incorporated into any of the other computer systems. That is to say, the computer system 100 may also be a system having a security product installed thereon.

The environment 1 includes an embedding model 202. The embedding model is configured to receive text and generate a vector representative of the text. The vector comprises a plurality of numerical values, which represent the text in an embedding space. Each numerical value may be in the range 0 to 1. The number of numerical values present in the vector may be referred to as the dimensionality of the vector.

The embedding model 202 generally represents the semantics (i.e. meaning) of the text in numerical form, such that texts that are similar in meaning result vectors that are close to one another in the embedding space. For example, two texts that are synonymous but differently phrased will have a distance in the embedding space (e.g. measured by some suitable distance metric such as cosine difference) that is small. However, two texts with entirely different meaning will be far apart in the embedding space. Embedding models are widely used in a range of text processing tasks.

The embedding model 202 is a trained machine learning model that generates the vector from the input text. In one example, the trained machine learning model is the text-embedding-ada-002 model provided by Open AI (see https://platform.openai.com/docs/models/embeddings). This model generates embedding vectors with 1536 dimensions. The inventors have found this model to be suitable for the techniques discussed herein, on the basis that the model is trained on a sufficiently large corpus and that the resulting model is able to suitably represent temporal data (i.e. timestamps) and security signal names. That is, it has been found that input texts that include conceptually security signal names result in vectors that are close in embedding space. Similarly, input texts that include similar timestamps or similarly ordered events expressed in timestamp form result in vectors that are close in embedding space.

However, it will be understood that other embedding models may also be employed. For example, other embedding models provided by Open AI may equally be suitable (e.g. text-embedding-3-small, text-embedding-3-large etc). Other embedding models may also be suitable, including well-known models such as Word2Vec, GloVe, and FastText.

In other examples, the embedding model may be trained or finetuned on security signal name and/or temporal data. For example, existing pretrained models that do not accurately represent security signal names or temporal data may be further trained on suitable training data including signal names and temporal data such as time stamps. Alternatively, an embedding model may be trained from scratch based on suitable training data including signal names and temporal data such as time stamps.

The embedding model 202 operates in a suitable computer system 200. For example, the embedding model 202 is stored in a suitable data centre, and/or as part of a cloud computing environment or other distributed environment. The embedding model 202 is accessible via APIs (application programming interfaces), for example over a network N2. The network may comprise any suitable links, including wired and wireless links and local and wide area networks.

The system 100 is configured to interact with the embedding model 201, for example by generating suitable API calls and submitting them to the model 201 over the network N2.

Figure 2:
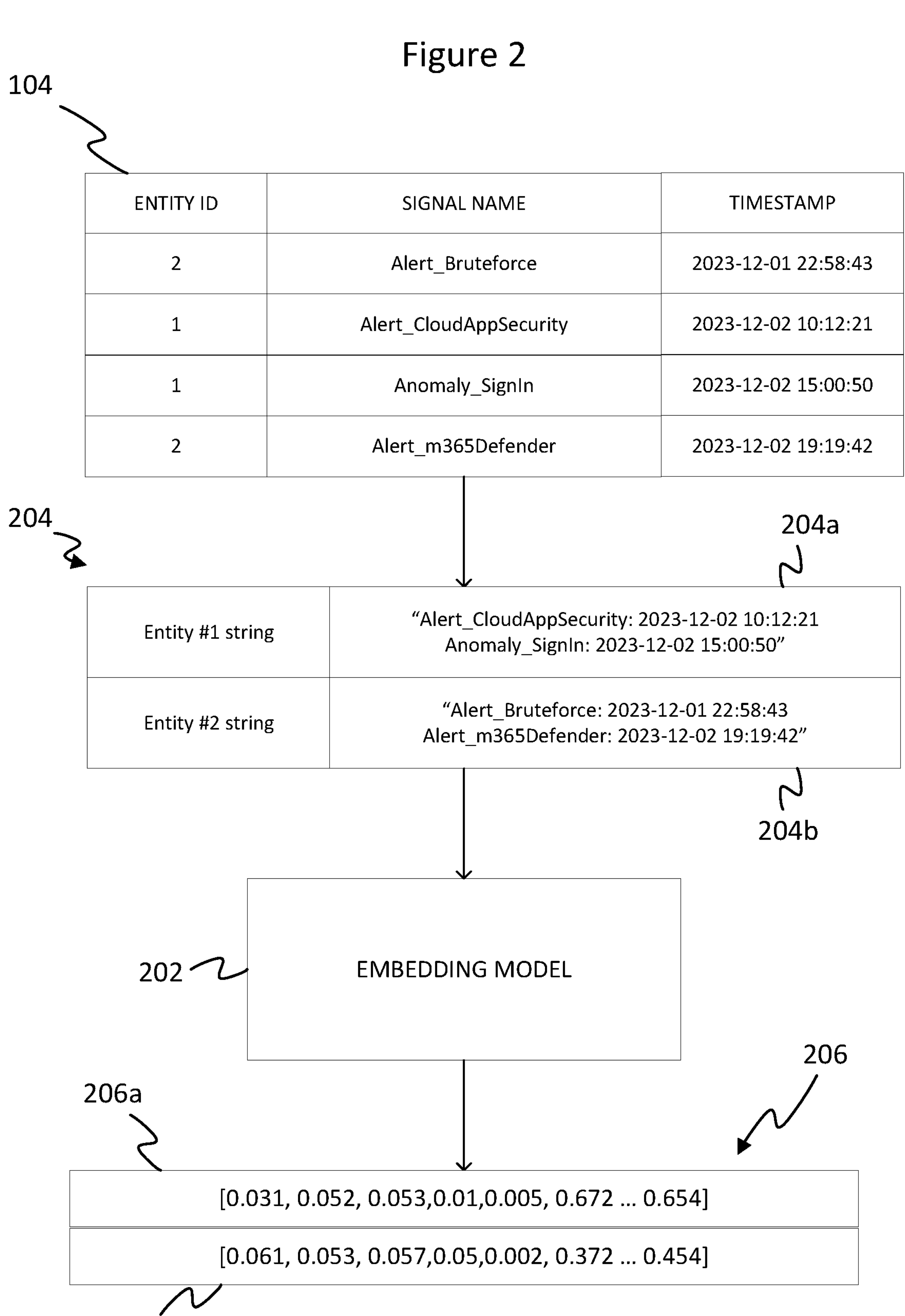
FIG. 2 is a schematic block diagram of an example of the operation of system FIG. 1 in more detail.

FIG. 2 illustrates an example of the operation of system 100 in more detail.

The system 100 is configured to generate strings 204 based on the received security signals 104. Each string 204 may relate to a subset of the received security signals 104. For example, each subset may relate to a particular entity, or in some examples a group of entities. Consequently, FIG. 2 illustrates a first string 204*a*, which corresponds to security signals 104 pertaining to entity #1, and a second string 204*b*, which corresponds to security signals 104 pertaining to entity #2 amongst the signals 104 illustrated in the table.

Each string 204 may take the form of a text-based narrative or storyline, which lists a plurality of security signals. The narrative is text-based in the sense that it is encoded in a string representation (e.g. ASCII, Unicode etc), such that it can be input to the embedding model 202. It need not include natural language (i.e. data expressed in the form of words).

Furthermore, each string 204 may relate to a specific time period. For example, each string 204 may relate to signals having a timestamp falling within a time window extending back in time from the current time. The window may be the past 48 hours, though in other examples the length of the period may differ (e.g. 1, 2, 4, 12, 24 or 72 hours). In other examples, the window need not run backwards from the present time, but could be some other relevant time window of interest, such as the previous whole day or previous whole two days.

The relevant subset of security signals 104 may be retrieved from the data structure in which they are stored, for example by querying a suitable database using an appropriate query language or extracting entries from a log file or similar. As noted above, the signals may be stored in a data storage structure of system 100, or they may be pulled (e.g. on demand) from the other systems 102 discussed above that generate the signals.

Other than being limited by time and/or entity, the signals 104 may be substantially unfiltered. That is to say, all security signals 104 generated pertaining to the entity may be included in the string, rather than some predetermined subset of signal types.

Once the subset of signals 104 pertaining to an entity and time window are retrieved, the string 204 is generated including details of each of the security signals. For example, for each security signal, the timestamp may be converted to a text format if it is stored in a specific date format. The timestamp may then be concatenated to the signal name. In the examples shown in the figures, the substring for each security signal takes the form of <signal name>:<timestamp>. However, this may be varied.

The substrings corresponding to each security signal 104 may then be concatenated to form the string 204. A suitable separator character or string of characters may be inserted between consecutive substrings corresponding to respective security signals. For example, each substring may be presented on a new line (such that the new line character \n is the separator), separated by commas, tabs or other special characters. In the example shown in the figures, the substrings are separated by a comma and a new line.

Each string 204 may be in chronological order. In other words, the security signals 104 described in each string are presented in the order in which they occurred, as reflected by their respective timestamps. Although shown in normal chronological order (i.e. from oldest to newest), in other examples the string may be in reverse chronological order. It may be the case that the signals 104 are stored in chronological order, such that sorting of the signals is not required. However, in some examples, the system may sort the signals 104 by chronological order (e.g. using a suitable database query in examples where the signals 104 are stored in a database) before generating the string 204.

In further examples, other pertinent information related to each security signal 104 may be included in the string 204. For example, although not shown in table 104 of FIG. 2, an identifier of the security product generating the alert may be included. The identifier may be the name of the security product, but it may also be some other identifier, such as an appropriate code. Alternatively or additionally, or a score reflective of the severity of the security signal 104 may be included. In other examples, the user name, device name, IP address or other similar data related to the signal 104 may be included.

The process of constructing (or generating) the string 204 may include retrieving one or more other strings (i.e. substrings) from the storage 120, including the separator text and the text of the signal names. It may also comprise generating one or more substrings, for example by converting data extracted from the storage (e.g., the timestamps). The resulting substrings can then be concatenated or otherwise combined to form the string 204. For example, each substring may be loaded into memory, and combined to in memory to form the larger string 204. The string 204 is then stored in memory (e.g., in volatile memory) before being transmitted to the embedding model 202, e.g., via an API call.

In response to the API call, the embedding model 202 provides a vectorized representation 206 of the string 204, as discussed above. FIG. 2 illustrates two vectors 206*a*, 206*b*, which correspond to respective strings 204*a*, 204*b*. Each vector 206 has a dimensionality as defined by the embedding model 202, which may for example be 1536 as discussed above. It will be understood that the numerical values shown in FIG. 2 are purely illustrative.

It may be the case that there is a 1:1 correspondence between API calls and strings 204. In other words, each API call may comprise a single string 204, and a single vector 206 is returned in response. However, in other examples a single API call may comprise a plurality of strings 204, with the response from the embedding model 202 comprising a vector 206 corresponding to each string 204.

Figure 3:
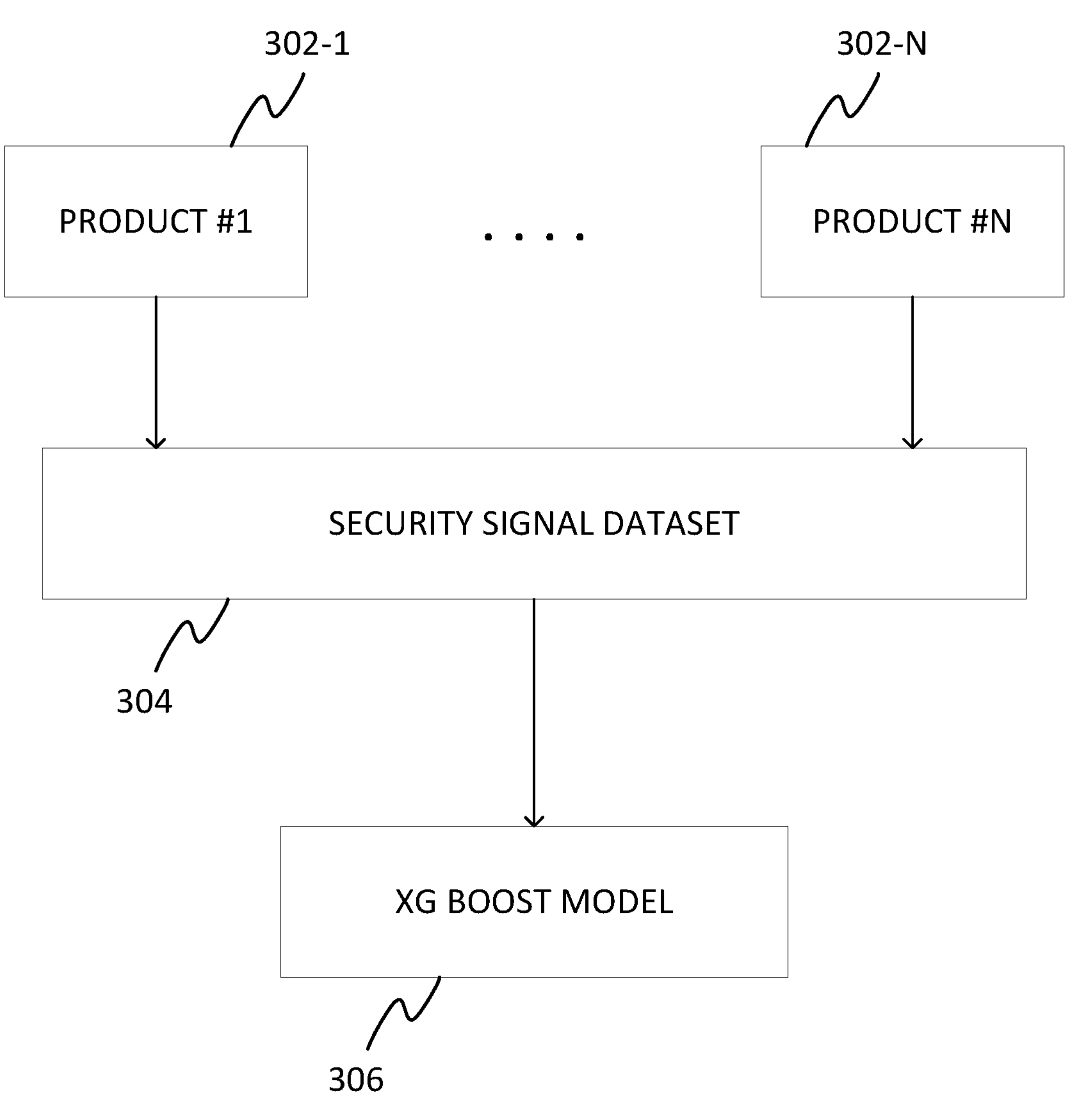
FIG. 3 is a schematic block diagram of an example technique for training of the machine learning model.

The vector 206 corresponding to the string 204 is then provided as input to a trained machine learning model (306, FIG. 3). The model 306 provides an output that is indicative of whether the input vector 206 is representative of malicious activity. In particular, the model 306 may predict whether, based on the activity represented in the string 204 (and thus the vector 206), malicious activity is likely to take place in a subsequent time period to that represented in the string 204. An example time period may be the following 24 hours.

The output provided by the trained machine learning model 306 may take various forms. In some examples, the trained machine learning model 306 provides a binary output, where 1 may represent a prediction of malicious activity and 0 may represent a prediction of no malicious activity. In other examples, the trained machine learning model 306 may provide a numerical output (e.g. between 0 and 1) representative of the likelihood or probability that the input vector 206 corresponds to malicious activity. This numerical output, which represents a risk score associated with the input vector 206, may be further processed (e.g. by applying suitable thresholds) as discussed below in order to provide a binary output or a multiclass output.

FIG. 3 illustrates an example technique for training of the machine learning model 306. As shown, security signals are retrieved from security products 302-1 to 302-N to form a security signal data set 304. The security products 302 may be those illustrated in FIG. 1, but need not be. For example, a whole month's worth of security signals 104 may be taken as the starting point for generating the security signal data set 304.

Each item of training data in the data set 304 represents a different time span of the security signal data, in respect of a given entity. For example, a 48-hour long sliding window is passed over the training data in 15-minute intervals. In other words, each data point in the training data represents the security signals from the previous 48 hours from a given end time of the window, wherein each end time is 15 minutes apart from the end time of the preceding training data item.

An embedding vector is then generated for each training data item substantially as discussed above, by generating a string including the names and timestamps of the security signals and inputting the string to the embedding model 202.

In one example, to reduce duplication, vectors that do not differ from the vector associated with the previous time window—i.e. because the security signals represented are the same—may be discarded.

Training data items that correspond to a situation where a customer (i.e. a user of one of the security products) has labelled the incident as genuine within a further 24-hour window from the end time of the 48 hour window covered by the signals are labelled as positive examples of malicious activity. Those training data items where no such labelling has taken place by the customer are labelled as negative examples of malicious activity.

It will be appreciated that in many circumstances, customers interacting with security products 102 are expert users such as security analysts trained in cybersecurity operations. This may especially be the case where the users are associated with an organization with a large Security Operation Center (SOC). Consequently, there may be a ready source of labelled data for training the machine learning model 306 discussed herein.

However, to avoid labelling inaccuracies, in some examples a list of reliable annotators may be maintained, such that only labels provided by the reliable annotators are used in the training data. This list may be curated through a set of heuristics aimed at identifying attributes indicative of a reliable annotator, thereby reducing label variance.

In one example, a training dataset encompassed approximately 150,000 entities derived from 109 distinct workspaces, each workspace being a centralized hub for data management in Microsoft Azure. The dataset includes two strings per entity, one labelled as a positive, the other as a negative example. The dataset maintained a mild balance, with positive examples constituting around 40% of the dataset.

It will be understood that this is only one example of a suitable training dataset for training a model to determine the presence of malicious activity. The 48-hour time window of the signals may be varied. Similarly, the 24-hour subsequent window in which a positive label is provided by a customer results in a positively labelled training data item may be also be varied. Whilst 15-minute intervals have been used between training data items, this interval may be varied. It will be further understood that the size and/or balance of the training data set may be varied.

Subsequently, the labelled training data set is used to train a supervised machine learning model 306. In one example, the machine learning model is an XGBoost model (see https://github.com/dmlc/xgboost). However, any suitable trainable machine learning model 306 may be employed, including any other gradient boosting techniques, neural networks, support vector machines and the like.

As discussed above, the machine learning model 306 may provide binary classification. That is to say, the output of the model 306 may be one of two categorical values, one reflective of a prediction that the input vector 206 corresponds to malicious activity and one reflective of a prediction that the input vector 206 does not correspond to malicious activity.

However, in other examples, the machine learning model 306 may provide multiclass classification, wherein the output is one of a plurality of predetermined labels. For example, the labels may correspond to levels of risk—e.g. low risk of malicious activity, medium risk of malicious activity or a high risk of malicious activity.

In yet further examples, the machine learning model 306 may output a numerical value representative of a confidence or probability that the input vector 206 corresponds to malicious activity. The numerical value may represent a risk score, representative of the level of risk of malicious activity associated with the input vector 206. In such an example, suitable thresholds may be applied to the numerical output value to determine whether malicious activity is present.

For example, a numerical output in a first range (e.g. 0.9-1.0) may result in a prediction that there is a high risk of malicious activity. A numerical output in a second range (e.g. 0.7-0.9) may result in a prediction that there is a medium risk of malicious activity. A numerical output in a third range (e.g. 0.0-0.7) may result in a prediction that there is a low risk of malicious activity. It will be understood that particular values of the ranges, and the number of ranges present, may be varied. The threshold or thresholds may be predetermined. For example, they may be set in advance by a user or system administrator. In other examples, the threshold may be learned from or calculated based on suitable data.

The system 100 may carry out the training of the machine learning model 306. However, in other examples, the training may be carried out on another computer (i.e., "offline"), and the trained model may then be stored in system 100.

In some examples, the model 306 may be retrained periodically, for example once an hour, once a day, once a week or at some other suitable interval, to take account of new training data items that may be available from the security products.

Figure 4A:
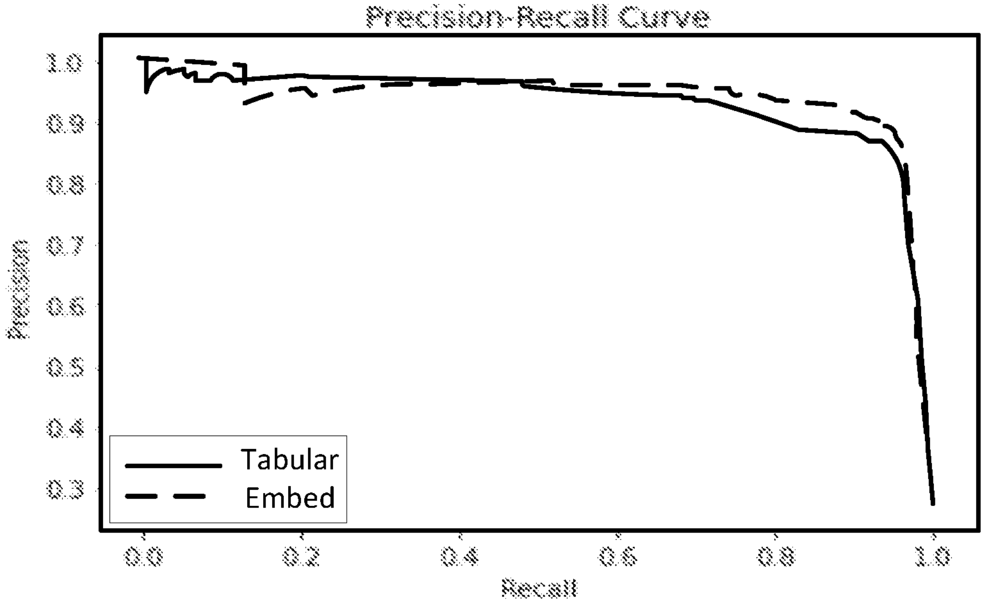
FIGS. 4A and 4B are graphical representations of the performance of the techniques discussed herein.
Figure 4B:
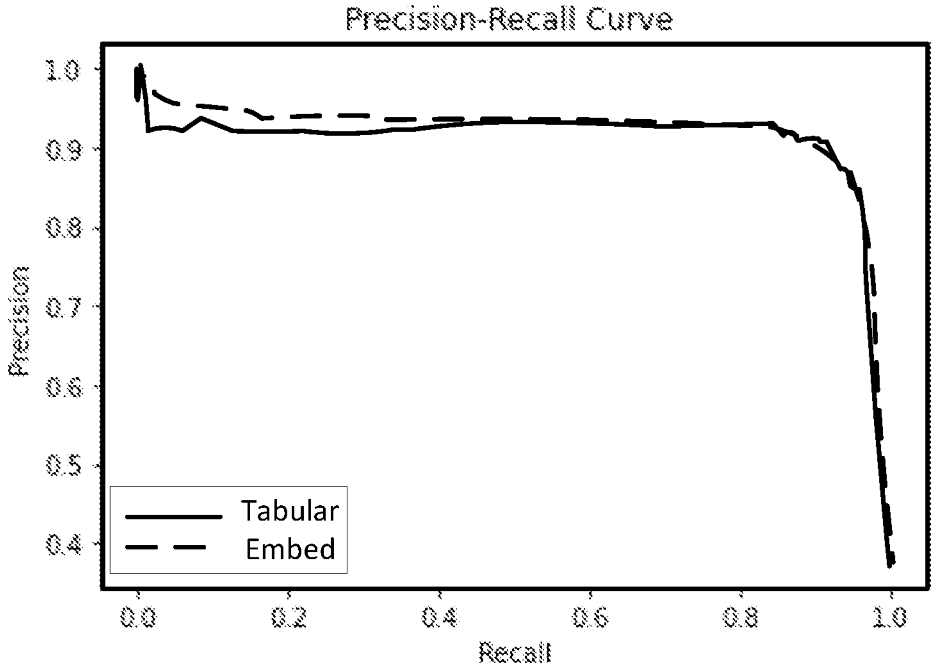

FIGS. 4A and 4B illustrate the performance of the techniques discussed herein, in comparison to a traditional tabular approach.

FIG. 4A illustrates an experiment in which 80% of the training data set discussed above having approximately with respect to FIG. 3 was used to train the model, and 20% of the training data set was instead used for testing. The balance between positive and negative examples was maintained in both subsets. Furthermore, the temporal aspect was taken into account in the partition, ensuring that the training set contained historical data, while evaluations were conducted on future samples. XGBoost models were used for both the techniques discussed herein and the traditional tabular approach, with the same hyperparameters used to train the models.

As shown in the precision-recall curve, the techniques herein provide a small performance improvement over the tabular techniques (area under the curve 0.98 compared to 0.97).

FIG. 4B illustrates an experiment in which the models are trained on 100% of the training data set discussed above, but instead tested on data derived from a further 153 workspaces. The graph illustrates that the embedding approach (i.e. the techniques disclosed herein) generalizes effectively to workspaces different from the population that the model was trained on. The performance of the tabular approach and the techniques herein is effectively on par—both having an area under the precision-recall curve of 0.97.

Figure 5:
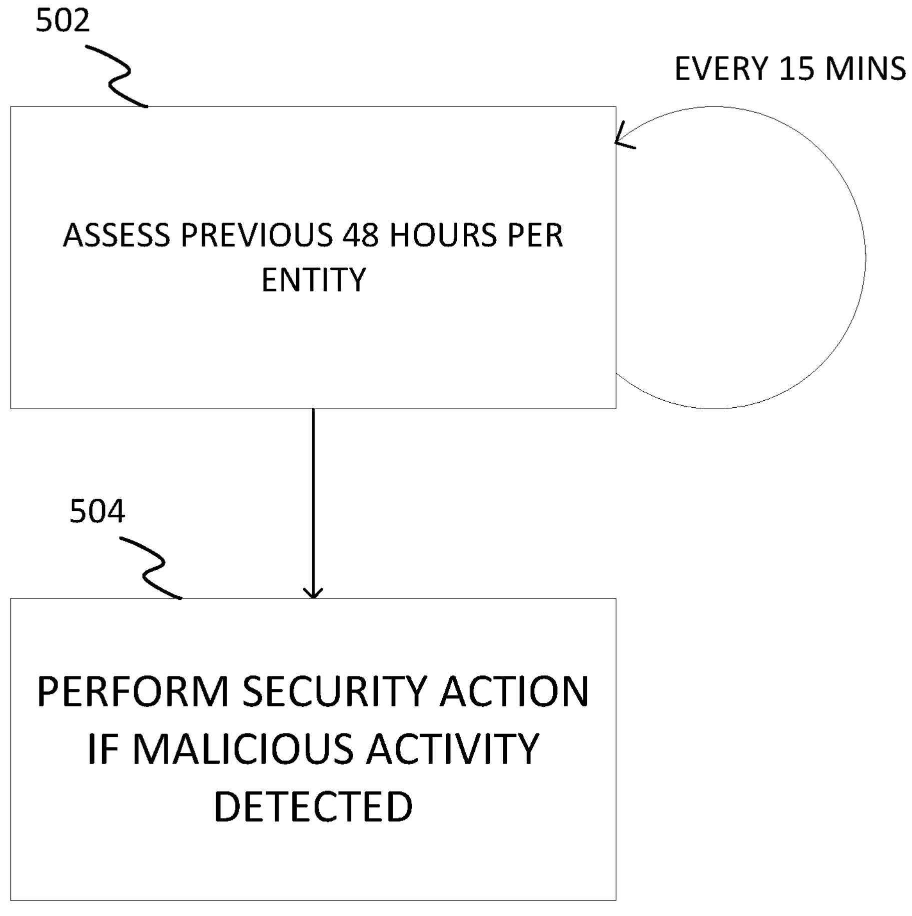
FIG. 5 is a schematic block diagram of further examples of the techniques discussed herein.

FIG. 5 illustrates further examples of the techniques discussed herein. In the example of FIG. 5, block 502 illustrates that the model 306 is used periodically to assess security signals received over a time window. In the example shown, the time window is 48 hours, which mirrors the period covered by the signals used in training the model 302. In the example shown, the model 306 assesses signals received over the time window every 15 minutes.

Block 502 illustrates that, in response to the model 306 output indicating the presence of malicious activity, the system 100 performs a security action.

For example, in response to detecting malicious activity, the system 100 may generate an alert for display in a security product (e.g. one of products 102), so that the malicious activity is drawn to the attention of a security analyst, system administrator or other individual capable of taking remedial action.

In another example, the system 100 may take remedial activity in response to the model 306 output. For example, the system 100 may take remedial action to suspend or disable a user account or change the rights of access of the user account. For example, in cases where the entity is a particular user (or group of users), that user (or group) may have their accounts suspended, disabled or their access rights changed.

In another examples, access may be prevented by the system 100 to a particular device and/or the device may be isolated from other devices. This may for example be the case where the entity corresponds to the device. In other examples, action such as terminating execution of a VM may be taken, for example where the VM is the entity in question.

In some examples, the system 100 may alternatively or additional cause or control a device to perform the security action. For example, the system 100 may control with a device (e.g. an individual networked computer, a cloud-hosted security system, a device controlling physical access to resources or any other suitable device) to perform the security action. In some examples, the device being controlled may be structured to perform the security action. For example, the device may include hardware and/or software such as networking hardware (e.g. routers, switches, firewalls) that can limit user access to network resources. The device may include hardware and/or software that can limit physical access to resources (e.g. controlling door locks or other physical barriers).

In examples where the output of the model 306 is numerical or represents two or more different categories, the remedial action taken may be in dependence on the output of the model 306. In other words, different levels of remedial action may be taken depending on the level of risk of malicious activity identified by the model.

Accordingly, an output reflective of high risk may result in more severe actions than an output reflective of medium risk. For example, an output reflective of high risk may result in account being disabled whereas an output reflective of medium risk may result in the transmission of an alert and/or the change of access rights.

In yet another example, the numerical output of the model may be used to generate a ranking of entities by risk. The ranking may enable a security analyst to readily identify high-risk entities.

Figure 6:
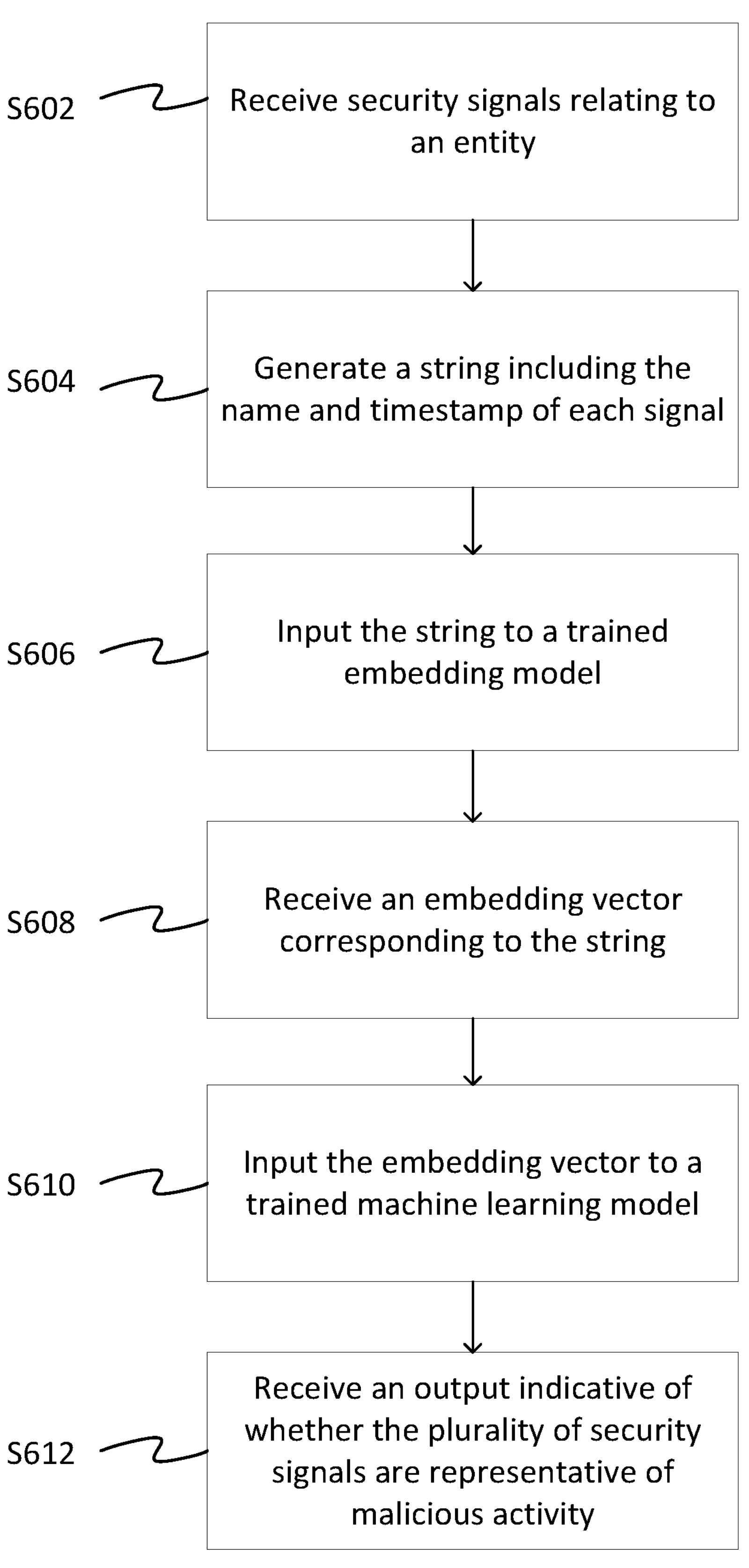
FIG. 6 is a flowchart illustrating an example method in accordance with the disclosure herein.

FIG. 6 is a flowchart illustrating an example method in accordance with the disclosure herein. The method may be executed by the system 100 discussed herein. In a first step S602, a plurality of security signals is received. In a second step S604, a string is generated based on the plurality of security signals, the string including a name of each security signal and a timestamp of each security signal. In a third step S606, the string is input to a trained embedding model and in response, in step S608, an embedding vector corresponding to the string is received. In a further step S610, the embedding vector is input to a trained machine learning model and in response, in step S612 an output is received indicative of whether the plurality of security signals are representative of malicious activity.

The method illustrated in FIG. 6 may include any of the further steps or processes discussed herein.

FIG. 7 schematically shows a non-limiting example of a computing system 1200 that can enact one or more of the methods and processes described above. Computing system 1200 is shown in simplified form. Computing system 1200 may embody any of the computer devices 100 or 200 described above, or any other computer device discussed herein. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 7.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e g., CD, DVD, HD-DVD, Blu-Ray Disc, etc), semiconductor memory (e g., ROM, EPROM, EEPROM, FLASH memory, etc.), and/or magnetic memory (e.g., hard-disk drive), or other mass storage device technology. Non volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). Because the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the internet.

A variety of modifications or alterations may be made to the examples disclosed herein within the scope of the disclosure. Although the examples refer to an embedding model hosted remotely in a cloud environment, it may be the case that the embedding model is stored locally. The embedding model in such examples may be accessed directly rather than via an API. In other examples, the functionality of the system 100 may be incorporated into one or more existing security products (e.g. as a plug-in or the like).

In other examples, the embedding model may be configured to receive multimodal input. The multimodal input may include the strings discussed herein, as well as input in one or more other modalities. For example, in some circumstances the other modalities may be image data, video data, audio data or sensor data forming part of or linked to the security signal. The embedding model is therefore not limited to a text-only embedding model.

Advantageously, the techniques herein make use of an embedding model to generate a vector that reflects the semantic content of the names of security signals, which typically are descriptive of the underlying condition they represent. Furthermore, the embedding model inherently is able to represent the temporal data associated with the security signals. This results in a trained machine learning model that is suitable to learn from similar security signals and temporal data, without being bound to predetermined features as in the tabular approach. In addition, the use of embeddings allows the model to straightforwardly adapt to new security signal names without the need to hard-code separate features in a feature vector. This is particularly helpful in circumstances where new security products and/or new attack vectors and associated alerts are created regularly.

Additional example features of the disclosure are set out below.

According to a first aspect of the disclosure, there is provided a computer-implemented method comprising: receiving a plurality of security signals relating to an entity; generating a string based on the plurality of security signals, the string including a name of each security signal and a timestamp of each security signal; inputting the string to a trained embedding model and in response receiving an embedding vector corresponding to the string; and inputting the embedding vector to a trained machine learning model and in response receiving an output, the output being indicative of whether the plurality of security signals are representative of malicious activity.

In some examples, the plurality of security signals may comprise or consist of a first security signal and a second security signal. The step of generating the string may be based on the first and second security signal. References herein to the plurality of security signals may be replaced by reference to a first security signal and a second security signal.

The method may comprise determining that the plurality of security signals are representative of malicious activity, and in response performing a security action. The security action may be one of: generating an alert; suspending, disabling or changing rights of access of a user account; preventing access to a device; terminating execution of a virtual machine. The alert may be displayed on a security product. The user account, device or virtual machine may be associated with the at least one entity.

The output may be a numerical value representative of a likelihood that the plurality of security signals is representative of malicious activity. The method may comprise comparing the output to a threshold, and in response to the output exceeding the threshold determining that the output indicates that the plurality of security signals is representative of malicious activity. The threshold may be predetermined. Suitably, the threshold may be set in advance by a user or system administrator.

The method may comprise determining that the output represents a first level of risk of malicious activity and in response performing a first security action. The method may comprise determining that the output represents a second level of risk of malicious activity and in response performing a second security action. The output may be a numerical value. Determining that the output represents the first level of risk of malicious activity may comprise determining that the output falls within a first range. Determining that the output represents the second level of risk of malicious activity may comprise determining that the output falls within a second range. The output may be one of a plurality of categories, where the plurality of categories includes a first category corresponding to the first level of risk and a second category corresponding to the second level of risk. The security action may comprise generating a ranked list of entities based on the numerical output.

The method may comprise ordering the plurality of security signals based on the timestamp of each security signal. The method may comprise generating the string based on the ordered plurality of security signals. The string may include the security signals in chronological order.

The string may further include, in respect of each security signal, an identifier of security product that generated the security signal. The identifier may be a name of the security product. The string may further include, in respect of each security signal, a severity level of the security signal. The string may be encoded in a text encoding format, suitably ASCII or Unicode.

The entity may be one of: a user; a group of users; a network location; a file; a physical device; or a virtual machine. The security signals may relate to a plurality of entities, suitably a plurality of users, a plurality of physical devices, a plurality of network locations, a plurality of files, a plurality of virtual machines or any combination of one or a plurality of the aforementioned items.

The plurality of security signals may fall within a first predetermined time window. The first predetermined time window may be one of 48 hours, 24 hours, or 12 hours. An endpoint of the predetermined time window may be the present time.

The output may be indicative of whether the plurality of security signals is representative of malicious activity occurring in a second predetermined time window, suitably after the first predetermined time window. The second predetermined time window may be 24 hours, 48 hours or 12 hours.

The trained machine learning model may be an XGBoost model. The embedding model may be a text-embedding-ada-002 model. The embedding model may generate an embedding vector having 1536 dimensions. The embedding model may be accessed via an application programming interface. The method may include training or finetuning the embedding model based on training data including security signal names and/or temporal data including timestamps.

Receiving the plurality of security signals relating to at least one entity may include retrieving data from a data store associated with a security product.

The security signals may represent anomalous activities such as any of activity from an infrequent country, activity from an anonymous IP address, activity performed by a terminated user, activity from a suspicious IP address, unusual file download or sharing activities, unusual file access or virtual machine creation, multiple failed login attempts, data exfiltration attempts.

The optional features defined above in relation to the first aspect may be combined in any combination. Accordingly, each sentence in the optional features defined above can be read as if it is a dependent claim referring to the features of any preceding sentence.

According to a second aspect of the disclosure, there is provided a computer-implemented method comprising: receiving a plurality of training security signals from a security product; generating a plurality of training strings, each training string corresponding to a respective subset of the plurality of training security signals; generating a plurality of labels, each label corresponding to a respective one of the training strings, wherein the label is a positive label in the event that the respective subset of the plurality of training security signals corresponds to a security incident, and the label is a negative label otherwise; generating a plurality of training embedding vectors, each corresponding to a respective one of the plurality of training strings, using a trained embedding model, and training a machine learning model using the plurality of training embedding vectors and the plurality of labels.

Each subset may comprise training security signals received in a respective first predetermined time window. The first predetermined time window may be one of 48 hours, 24 hours, or 12 hours. Each first predetermined time window may have a start time. Suitably, the start time of each first predetermined time window differs from the start time of others of the first predetermined time windows. The start times of the first predetermined time windows may be at 15 minute intervals. The method may comprise discarding a training string that is the same as a training string of a preceding first predetermined time window.

The label may be positive in the event that the subset corresponds to a security incident occurring within a second predetermined time window. The second predetermined time window may be after the first predetermined time window. The second predetermined time window may be 24 hours, 48 hours or 12 hours.

The subset may correspond to at least one entity.

The machine learning model may be an XGBoost model.

The optional features defined above in relation to the second aspect may be combined in any combination. Furthermore, the optional features defined above in relation to the first aspect may be combined with the second aspect in any combination. Accordingly, each sentence in the optional features defined above can be read as if it is a dependent claim referring to the features of any preceding sentence. Furthermore, any of the dependent claims appended hereto that refer to a specific claim are explicitly envisaged to be dependent on any preceding claim or any prior independent claim.

The disclosure further extends to a method combining the features of the first and second aspects. That is to say, the disclosure extends to methods of training a machine learning model and subsequently using the machine learning model at inference time to assess received security signals. The trained machine learning model of the first aspect may be trained according to the method of the second aspect.

According to another aspect of the disclosure there is provided a computer system comprising a processor and a memory, the memory storing instructions, which when executed by the processor, cause the system to carry out any of the methods defined herein.

According to another aspect of the disclosure there is provided a tangible non-transient computer-readable storage medium having recorded thereon instructions which, when executed by a computer device, cause the computer device to perform any of the methods set forth herein.

According to another aspect of the disclosure there is provided a computer program product comprising instructions which, when executed by a computer device, cause the computer device to perform any of the methods set forth herein.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer-implemented method comprising:

receiving, from a security product, a plurality of security signals relating to an entity;

generating a string based on the plurality of security signals, the string including a name of each security signal, a timestamp of each security signal, and an identifier of the security product;

inputting the string to a trained embedding model and in response receiving an embedding vector corresponding to the string; and inputting the embedding vector to a trained machine learning model and in response receiving an output, the output being indicative of whether the plurality of security signals is representative of malicious activity.

2. The method of claim 1, comprising:

determining that the output indicates that the plurality of security signals is representative of malicious activity, and in response performing a security action.

3. The method of claim 2, wherein the security action is one of:

generating an alert;

suspending, disabling or changing rights of access of a user account;

preventing access to a device;

terminating execution of a virtual machine.

4. The method of claim 1, wherein the output is a numerical value representative of a likelihood that the plurality of security signals is representative of malicious activity, and the method comprises comparing the output to a threshold, and in response to the output exceeding the threshold determining that the output indicates that the plurality of security signals is representative of malicious activity.

5. The method of claim 1, comprising:

determining that the output represents a first level of risk of malicious activity and in response performing a first security action; or determining that the output represents a second level of risk of malicious activity and in response performing a second security action.

6. The method of claim 1, wherein generating the string based on the plurality of security signals comprises:

ordering the plurality of security signals based on the timestamp of each security signal;

generating the string based on the ordered plurality of security signals.

7. The method of claim 1, wherein the malicious activity is predicted to take place in a subsequent time period to that represented by the timestamps in the string.

8. The method of claim 1, wherein the string further includes, in respect of each security signal, a severity level of the security signal.

9. The method of claim 1, wherein the entity is one of: a user; a group of users; a network location; a file; a physical device; or a virtual machine.

10. The method of claim 1, wherein the plurality of security signals falls within a first time window, and wherein the output is indicative of whether the plurality of security signals is representative of malicious activity occurring in a second time window occurring after the first time window.

11. A computer-implemented method, comprising:

receiving a plurality of training security signals from a security product;

generating a plurality of training strings, each training string corresponding to a respective subset of the plurality of training security signals, the training string including a name of each security signal in the respective subset, a timestamp of each security signal in the respective subset, and an identifier of the security product;

generating a plurality of labels, each label corresponding to a respective one of the training strings, wherein the label is a positive label in the event that the respective subset of the plurality of training security signals corresponds to a security incident, and the label is a negative label otherwise;

generating a plurality of training embedding vectors, each corresponding to a respective one of the plurality of training strings, using a trained embedding model; and training a machine learning model using the plurality of training embedding vectors and the plurality of labels.

12. The method of claim 11, wherein each subset of the plurality of training security signals comprises training security signals received in a respective first time window.

13. The method of claim 12, wherein each first time window comprises a start time, the start time of each first time window being different from the start time of others of the first time windows.

14. The method of claim 12, wherein the label is positive in the event that the subset corresponds to a security incident occurring within a second time window occurring after the first time window.

15. The method of claim 11, comprising discarding a training string that is the same as a training string of a preceding first time window.

16. The method of claim 11, wherein each subset of the plurality of training security signals corresponds to at least one entity.

17. The method of claim 11, wherein generating each of the plurality of training strings comprises:

ordering the respective subset of plurality of security signals based on the timestamp of each security signal;

generating the training string based on the ordered plurality of security signals.

18. A system comprising a processor and a memory, the memory storing computer-readable instructions, which when executed by the processor, cause the system to carry out operations comprising:

receiving a plurality of security signals relating to at least one entity;

generating a string based on the plurality of security signals, the string including a name of each security signal, a timestamp of each security signal, and an identifier of a security product generating the security signal;

inputting the string to a trained embedding model and in response receiving an embedding vector corresponding to the string; and inputting the embedding vector to a trained machine learning model and in response receiving an output, the output being indicative of whether the plurality of security signals is representative of malicious activity.

19. The system of claim 18, storing computer-readable instructions in the memory which when executed by the processor cause the system to carry out operations comprising:

determining that the output indicates that the plurality of security signals is representative of malicious activity, and in response performing a security action.

20. The system of claim 18, wherein the plurality of security signals falls within a first time window, and wherein the output is indicative of whether the plurality of security signals is representative of malicious activity occurring in a second time window after the first time window.

* * * * *